US007139849B2

(12) United States Patent
Tojima et al.

(10) Patent No.: US 7,139,849 B2
(45) Date of Patent: Nov. 21, 2006

(54) SEMICONDUCTOR INTEGRATED CIRCUIT DEVICE (75) Inventors: Masayoshi Tojima, Fukuoka (JP); Hiroshi Miyajima, Fukuoka (JP); Yoshinori Okajima, Kanagawa (JP)

(73) Assignee: Matsushita Electric Industrial Co., Ltd., Osaka (JP)

( * ) Notice: Subject to any disclaimer, the term of this patent is extended or adjusted under 35 U.S.C. 154(b) by 545 days.

(21) Appl. No.: 10/624,598

(22) Filed: Jul. 23, 2003

(65) Prior Publication Data

US 2004/0030844 A1 Feb. 12, 2004

(30) Foreign Application Priority Data

Aug. 7, 2002 (JP) .............................. 2002-229452

(51) Int. Cl.
G06F 3/00 (2006.01)
(52) U.S. Cl. .......................... 710/22; 710/8; 711/147; 711/148; 711/152; 711/153
(58) Field of Classification Search .................... 710/8, 710/22, 52; 711/147–153
See application file for complete search history.

(56) References Cited

U.S. PATENT DOCUMENTS

| 4,827,406 | A | * | 5/1989 | Bischoff et al. | ............ | 711/153 |
| 5,619,676 | A | * | 4/1997 | Fukuda et al. | ............... | 711/137 |
| 5,933,855 | A | | 8/1999 | Rubinstein | | |
| 6,195,733 | B1 | * | 2/2001 | Nair et al. | ................... | 711/202 |
| 6,640,019 | B1 | * | 10/2003 | Kosugi et al. | ............... | 382/299 |
| 2001/0040580 | A1 | * | 11/2001 | Margulis | .................... | 345/541 |

FOREIGN PATENT DOCUMENTS

| JP | 03-214250 | 9/1991 |
| JP | 06-309218 | 11/1994 |
| JP | 10-27131 | 1/1998 |
| JP | 10-133941 | 5/1998 |
| JP | 10-207821 | 8/1998 |
| JP | 10-260952 | 9/1998 |
| JP | 10-511514 | 11/1998 |
| JP | 11-133945 | 5/1999 |
| JP | 11-296154 | 10/1999 |
| JP | 2000-99391 | 4/2000 |
| JP | 2000-200214 | 7/2000 |
| JP | 2000-207348 | 7/2000 |
| JP | 2001-43180 | 2/2001 |
| JP | 2001-339612 | 12/2001 |

(Continued)

OTHER PUBLICATIONS

Ito et al., "MPEG-4 Multi-Codec LSI for W-CDMA Image Terminals", Matsushita Technical Journal vol. 47, No. 6, pp. 68-72, Matsushita Electric Industrial Co., Ltd., Dec. 2001.

Primary Examiner—Kim Huynh
Assistant Examiner—Eron Sorrell
(74) Attorney, Agent, or Firm—McDermott Will & Emery LLP (57) ABSTRACT A semiconductor integrated circuit device includes a plurality of internal memories, a main processor, which constitutes a first processing unit having a codec function, and a video interface and graphics processor, which constitute a second processing unit for video display processing. The semiconductor integrated circuit device operates while being connected to a CPU, which is an external processing unit, and an external memory. The semiconductor integrated circuit device is provided with a memory configuration controller for controlling the memory allocation to the first, the second, and the external processing unit in accordance with an application.

10 Claims, 7 Drawing Sheets

FOREIGN PATENT DOCUMENTS

| | | | |
|---|---|---|---|
| JP | 2002-041285 | 2/2002 | |
| WO | WO 96/19894 | 6/1996 | |

* cited by examiner

| operating mode | MPEG-4 processing (MP) | video display (VIF, GFX) processing | CPU processing |
|---|---|---|---|
| A | 8Mbit | | |
| B | 6Mbit | 2Mbit | |
| C | 4Mbit | 4Mbit | |
| D | 4Mbit | 2Mbit | 2Mbit |
| E | | 4Mbit | 4Mbit |
| F | | 8Mbit | |
| G | | | 8Mbit |

FIG. 4A

| memory | SDRAM | SRAM3 | | SRAM2 | | SRAM1 | | SRAM0 | |
|---|---|---|---|---|---|---|---|---|---|
| first register | bit9 | bit8 | bit7 | bit6 | bit5 | bit4 | bit3 | bit2 | bit1 | bit0 |
| initial value | 00 | 00 | | 00 | | 00 | | 00 | |

FIG. 4B

| bit1 | bit0 | meaning |
|---|---|---|
| 0 | 0 | work region |
| 0 | 1 | frame region |
| 1 | 0 | CPU region |
| 1 | 1 | unused |

FIG. 5A

| memory | SDRAM | SRAM3 | SRAM2 | SRAM1 | SRAM0 |
|---|---|---|---|---|---|
| second register | bit5-4 | bit3 | bit2 | bit1 | bit0 |
| initial value | 00 | 0 | 0 | 0 | 0 |

FIG. 5B

| bit0 | meaning |
|---|---|
| 0 | 2Mbit |
| 1 | 4Mbit |

FIG. 5C

| bit5 | bit4 | meaning |
|---|---|---|
| 0 | 0 | unused |
| 0 | 1 | 64Mbit |
| 1 | 0 | 128Mbit |
| 1 | 1 | 256Mbit |

SEMICONDUCTOR INTEGRATED CIRCUIT DEVICE

BACKGROUND OF THE INVENTION

The present invention relates to semiconductor integrated circuit devices that include a plurality of internal memories and a plurality of processing units for data processing, and that operate while being connected to an external processing unit.

JP H10-27131A discloses a shared memory device performing conflict control for DMA transfer requests from a plurality of communication controllers, wherein even while one memory bank is being used, access to other memory banks is possible, and thus the frequency that the communications controllers are caused to wait by shared memory access is reduced.

JP H10-260952A discloses a technology for flexibly connecting the processors and the memory banks in a multi-processor system LSI with an integrated multibank memory.

JP 2000-99391A discloses a printer device, in which memory banks can be accessed simultaneously by mediating access to the memory banks of a memory individually for each memory bank.

JP 2001-43180A discloses a microprocessor in which a plurality of resources share a single memory, and no-wait access is possible in parallel.

There is thus a need for memory allocation to various processing units in semiconductor integrated circuit devices that include a plurality of internal memories and a plurality of processing units for data processing, and that operate while being connected to an external processing unit.

SUMMARY OF THE INVENTION

It is an object of the present invention to provide an appropriate memory allocation in accordance with an application.

In order to attain this object, a semiconductor integrated circuit in accordance with the present invention, which operates while being connected to an external processing unit, includes a plurality of internal memories, a first processing unit for data processing and a second processing unit for data processing, and a memory configuration controller for controlling the assignment of the plurality of internal memories to the first processing unit, the second processing unit and the external processing unit in accordance with an application.

With the present invention, an appropriate memory allocation in accordance with an application can be realized. For example, the plurality of internal memories can be allocated to the first processing unit, the second processing unit and the external processing unit respectively, or the plurality of internal memories all can be occupied exclusively by the first or the second processing unit. Furthermore, it is also possible that the plurality of internal memories are all occupied by the external processing unit. In this last example, the semiconductor integrated circuit device operates merely as a memory device for the external processing unit.

DETAILED DESCRIPTION OF THE INVENTION

The following is a detailed description of embodiments of the present invention, with reference to the accompanying drawings.

Figure 1:
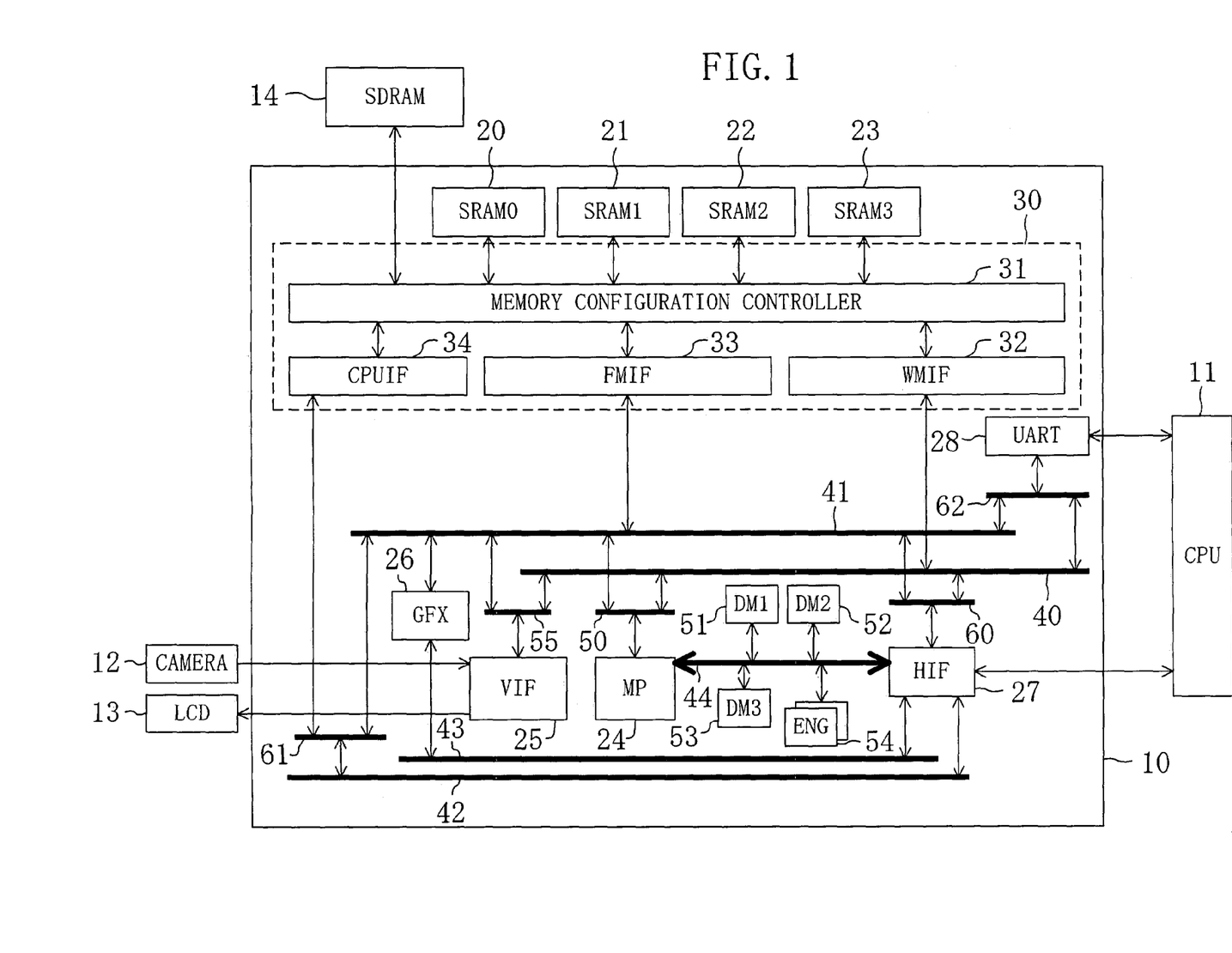
FIG. 1 is a block diagram showing an example of the internal configuration of a semiconductor integrated circuit device according to the present invention, as well as its external connections.

FIG. 1 shows an example of the internal configuration of a semiconductor integrated circuit device according to the present invention, as well as its external connections. The semiconductor integrated circuit device 10 in FIG. 1, which is for image processing, operates while being connected to a CPU 11, which is an external processing unit, a camera 12 for image input, a liquid crystal display (LCD) 13 for image display, and an external memory 14 made of an SDRAM. The maximum storage capacity of the external memory 14 is for example 256 Mbit (megabit).

The semiconductor integrated circuit device 10 includes a plurality of internal memories 20 to 23 made of SRAMs 0 to 3, a main processor (MP) 24, a video interface (VIF) 25, a graphics processor (GFX) 26, a host interface (HIF) 27, and an asynchronous serial interface (UART) 28. The main processor 24 is a first processing unit for image data processing and has a codec (encode/decode) function in accordance with MPEG-4. The video interface 25 and the graphics processor 26 constitute a second processing unit for image data processing, controlling the video display processing. The storage capacity of the internal memories 20 to 23 is, for example, 2 Mbit or 4 Mbit each. The video interface 25 is connected to the camera 12 and the liquid crystal display 13, whereas the host interface 27 and the asynchronous serial interface 28 are connected to the CPU 11.

The semiconductor integrated circuit device 10 of FIG. 1 is further provided with a memory controller 30 including a memory configuration controller 31. The memory configuration controller 31 controls the allocation of memory for the main processor 24, the video interface 25, the graphics processor 26, and the CPU 11, in accordance with the application. Of the internal memories 20 to 23 and the external memory 14, a memory is assigned to the main processor 24, and used by it as a work region. Of the internal memories 20 to 23 and the external memory 14, a memory is assigned to the video interface 25 and the graphics processor 26, and used by them as a frame region, which is commonly called "frame memory." Of the internal memories 20 to 23 and the external memory 14, a memory is assigned to the CPU 11, and used by it as a CPU region.

The memory controller 30 further includes a work region memory interface (WMIF) 32 serving as a first memory interface, a frame region memory interface (FMIF) 33 serving as a second memory interface, and a CPU region memory interface (CPUIF) 34 serving as a third memory interface. In correspondence thereto, the semiconductor integrated circuit device 10 in FIG. 1 is provided with a WM bus (first data bus) 40, an FM bus (second data bus) 41, and a CPU bus (third data bus) 42 dedicated to the CPU 11. The WMIF 32 is interposed between the work region assigned to the main processor 24 and the WM bus 40, and mediates and controls DMA data transfer requests. The FMIF 33 is interposed between the frame region assigned to the video interface 25 and the graphics processor 26 on the one hand and the FM bus 41 on the other hand, and mediates and controls DMA data transfer requests. The CPUIF 34 is interposed between the CPU region and the CPU bus 42, and is an interface controlling data transfer. Thus, the memory assigned to the work region can be accessed via the WMIF 32, the memory assigned to the frame region can be accessed via the FMIF 33, and the memory assigned to the CPU region can be accessed via the CPUIF 34. It should be noted that a host bus 43 is provided between the graphics processor 26 and the host interface 27. Furthermore, the main processor 24 includes a local bus 44 that is connected to the host interface 27.

The main processor 24 can be connected via an MP bus selector 50 to either the WM bus 40 or the FM bus 41, and is provided over a local bus 44 with a plurality of local memories (DM 1, DM 2 and DM 3) 51 to 53 and a plurality of hardware engines (ENG) 54. The hardware engines 54 are partial processing cores for encoding/encoding MPEG image data. The video interface 25 can be connected via a VIF bus selector 55 to either the WM bus 40 or the FM bus 41. The graphics processor 26 can be connected only to the FM bus 41 and not to the WM bus 40. The host interface 27 can be connected via an HIF bus selector 60 to either the WM bus 40 or the FM bus 41. Furthermore, the host interface 27 can be connected via the CPU bus 42 and the CPU IF bus selector 61 to either the CPU IF 34 or the FM bus 41. The asynchronous serial interface 28 can be connected via the UART bus selector 62 to either the WM bus 40 or the FM bus 41.

The main processor 24 can instruct a DMA data transfer between the local memories 51 to 53 and the work region via the MP bus selector 50, the WM bus 40 and the WMIF 32, and it can instruct a DMA data transfer between the local memories 51 to 53 and the frame region via the MP bus selector 50, the FM bus 41 and the FMIF 33. Furthermore, the main processor 24 can instruct a DMA data transfer between the a host memory within the host interface 27 and the work region via the HIF bus selector 60, the WM bus 40 and the WMIF 32, and it can instruct a DMA data transfer between the a host memory within the host interface 27 and the frame region via the HIF bus selector 60, the FM bus 41 and the FMIF 33. Furthermore, the main processor 24 can instruct a DMA data transfer between the a FIFO memory within the asynchronous serial interface 28 and the work region via the UART bus selector 62, the WM bus 40 and the WMIF 32, and it can instruct a DMA data transfer between the a FIFO memory within the asynchronous serial interface 28 and the frame region via the UART bus selector 62, the FM bus 41 and the FMIF 33. The DMA data transfer between the local memories 51 to 53 and the work region and the DMA data transfer with the host memory within the host interface 27 or the FIFO memory within the asynchronous serial interface 28 can be carried out in parallel. Furthermore, the DMA data transfer between the local memories 51 to 53 and the frame region and the DMA data transfer with the host memory within the host interface 27 or the FIFO memory within the asynchronous serial interface 28 also can be carried out in parallel.

Moreover, the main processor 24 can instruct a DMA data transfer between an internal memory of the video interface 25 and the work region via the VIF bus selector 55, the WM bus 40 and the WMIF 32, and it can instruct a DMA data transfer between the internal memory of the video interface 25 and the frame region via the VIF bus selector 55, the FM bus 41 and the FMIF 33. Furthermore, the main processor 24 can instruct a DMA data transfer between the internal memory of the graphics processor 26 and the frame region via the FM bus 41 and the FMIF 33. The DMA data transfer between the local memories 51 to 53 of the main processor 24 and the work region and the DMA data transfer between the internal memories of the video interface 25 and the graphics processor 26 and the frame region can be carried out in parallel. Furthermore, the DMA data transfer between the local memories 51 to 53 of the main processor 24 and the frame region and the DMA data transfer between the internal memories of the video interface 25 and the graphics processor 26 and the work region also can be carried out in parallel. It is also possible to proceed with the data processing using the local memories 51 to 53, while the main processor 24 carries out a DMA data transfer for the video interface 25 for example.

The CPU 11 is provided with three memory access routes for parallel data. First, there is access via the host interface 27, with which writing from the CPU 11 into the host memory provided within the host interface 27 is performed. In response to this, the main processor 24 instructs a DMA data transfer between the host memory and the work region or the frame region. Thus, the CPU 11 can achieve the writing of graphics data into a portion of the frame region, for example. Second, there is a route for the case that the CPU 11 accesses the CPU region without passing through the host memory, and this route passes from the CPU 11 through the host interface 27, the CPU bus 42, the CPUIF bus selector 61, and the CPUIF 34 to the CPU region. Third, there is a route for the case that the CPU 11 accesses the frame region without passing through the host memory, and this route passes from the CPU 11 through the host interface 27, the CPU bus 42, the CPUIF bus selector 61, the FM bus 41 and the FMIF 33 to the frame region. If the second route is selected, relative memory addresses are specified by the CPU 11. And if DMA data transfer with the first or the third route is selected, then absolute memory addresses are specified by the CPU 11, and mediation with other DMA data transfer requests (for example of the video interface 25 or the graphics processor 26) is performed. It should be noted that the DMA priority rank of the CPU 11 should be set one lower than that of the graphics processor 26.

Figure 2:
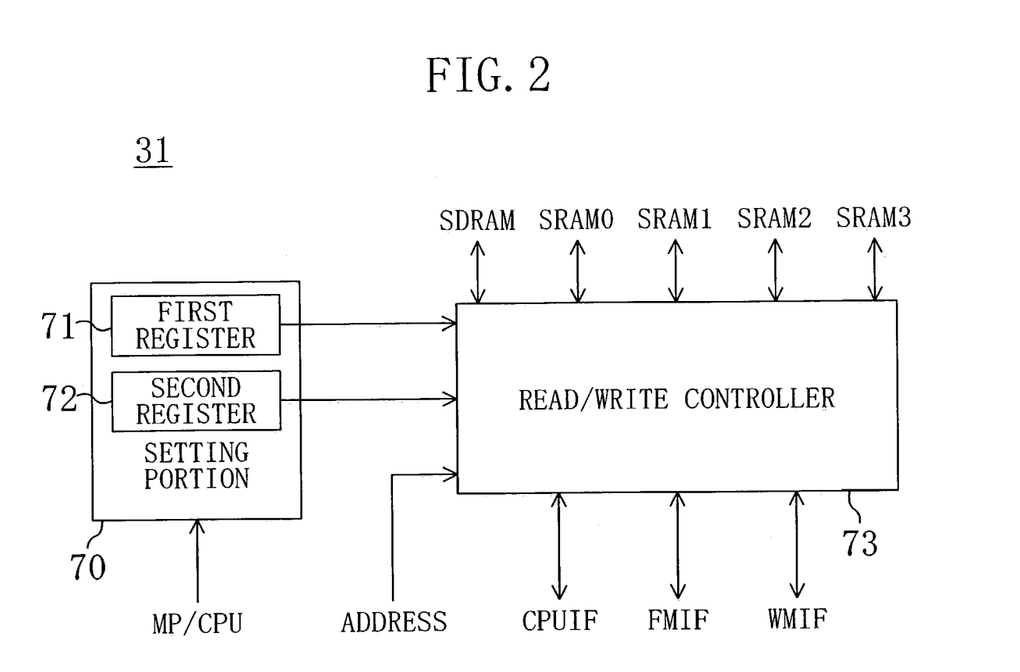
FIG. 2 is a block diagram showing a more detailed configuration example of the memory configuration controller in FIG. 1.

FIG. 2 shows a more detailed configuration example of the memory configuration controller 31 in FIG. 1. The memory configuration controller 31 has a setting portion 70, and this setting portion 70 includes a first register 71 for specifying the intended use of the memories, and a second register 72 for specifying the storage capacity of the memories. In accordance with these registers 71 and 72, a read/ write controller 73 directs access signals from the WMIF 32, the FMIF 33 and the CPUIF 34 to the individual memories. It should be noted the first and the second registers 71 and 72 can be set as desired by the main processor 24 and the CPU 11.

Figure 3:
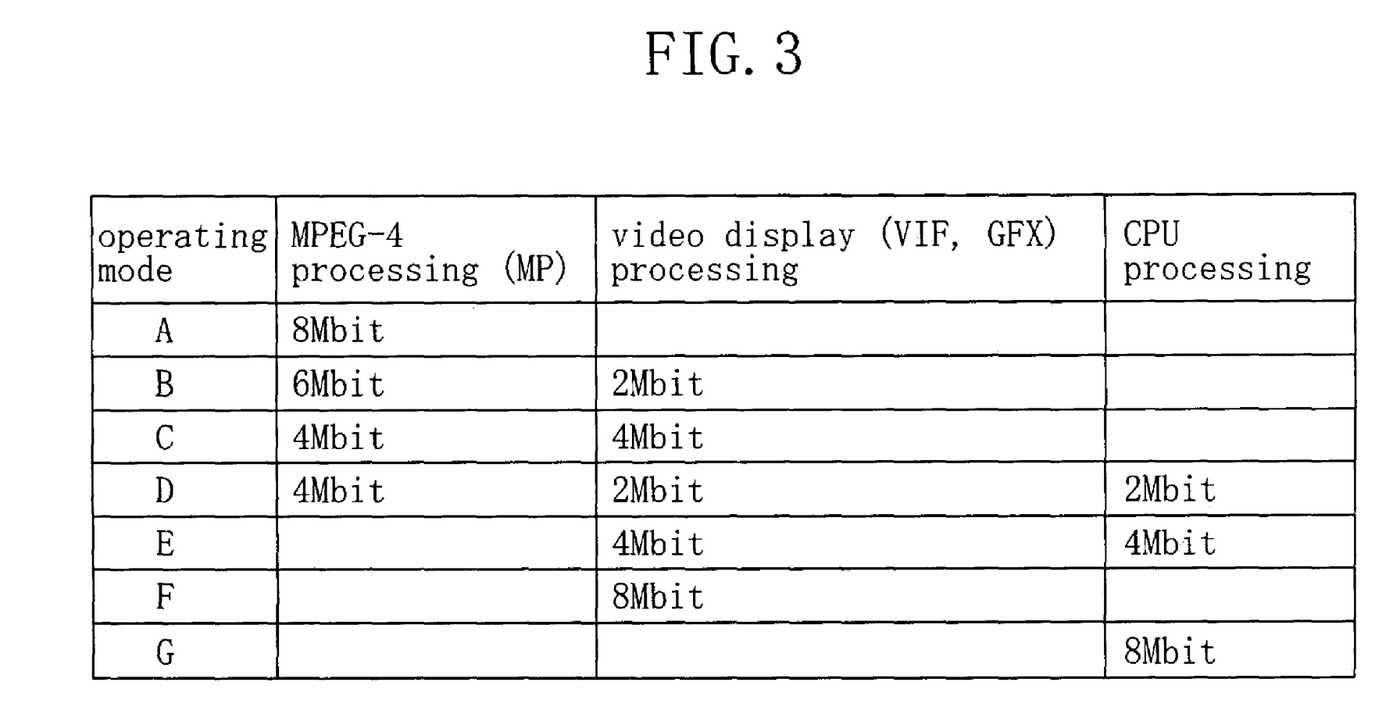
FIG. 3 shows an example of the memory allocation for each operation mode, in accordance with the application of the semiconductor integrated circuit in FIG. 1.

FIG. 3 shows an example of the memory allocation for each operation mode, in accordance with the application of the semiconductor integrated circuit device 10 in FIG. 1. Here, each of the four internal memories 20 to 23 is assumed to have a storage capacity of 2 Mbit. This means that the total storage capacity of the internal memories 20 to 23 is 8 Mbit. The memory configuration controller 31 plays the important roll of effectively putting to use the these limited memory resources. For example, in an operating mode A, all of the internal memories 20 to 23 are occupied by the main processor 24. In the operating mode B, 6 Mbit of the total capacity of the internal memories 20 to 23 are allocated to the main processor 24, and 2 Mbit are allocated to the video interface 25 and the graphics processor 26. In the operating mode C, 4 Mbit of the total capacity of the internal memories 20 to 23 are allocated to the main processor 24, and 4 Mbit are allocated to the video interface 25 and the graphics processor 26. In the operating mode D, 4 Mbit of the total capacity of the internal memories 20 to 23 is allocated to the main processor 24, 2 Mbit are allocated to the video interface 25 and the graphics processor 26, and 2 Mbit are allocated to the CPU 11. In the operating mode E, 4 Mbit of the total capacity of the internal memories 20 to 23 are allocated to the video interface 25 and the graphics processor 26, and 4 Mbit are allocated to the CPU 11. In the operating mode F, all of the internal memories 20 to 23 are occupied by the video interface 25 and the graphics processor 26. In the operating mode G, all of the internal memories 20 to 23 are occupied by the CPU 11. In this last operating mode G, the former functions of the main processor 24, the video interface 25 and the graphics processor 26 are stopped, and the semiconductor integrated circuit device 10 operates merely as a memory device for the CPU 11. In this manner, memory allocation that is appropriate for the application can be realized by the memory configuration controller 31. It should be noted, that MPEG-4 processing with the main processor 24, video display processing with the video interface 25 and the graphics processor 26, and processing with the CPU 11 can be carried out in parallel.

Figure 4A:
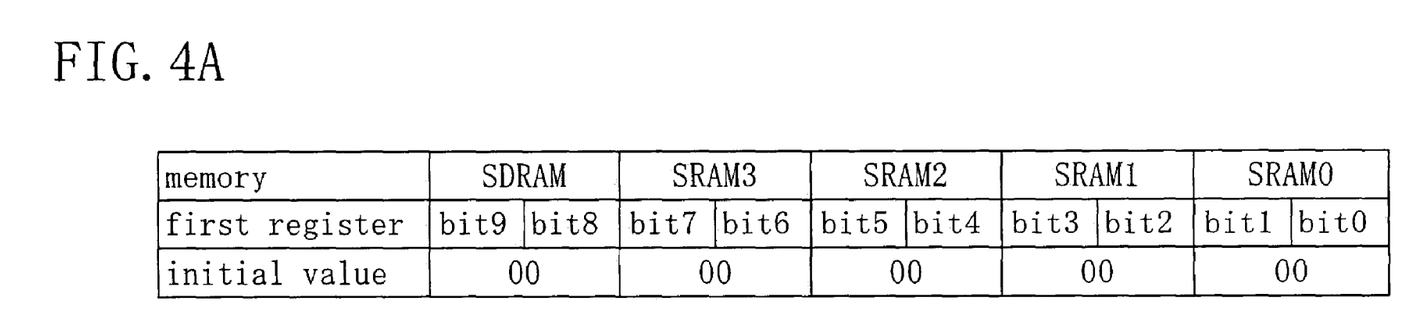
FIG. 4A shows an example of a first register for specifying the intended use of the memories in the semiconductor integrated circuit device in FIG. 1.
Figure 4B:
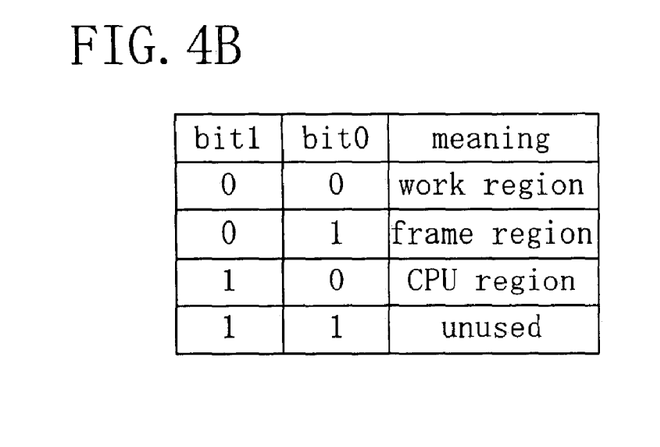
FIG. 4B illustrates the meaning of the least significant two bits in that register.

FIG. 4A shows an example of a first register 71 with a 10-bit configuration, and FIG. 4B illustrates the meaning of the least significant two bits in that register. If the bits 1 and 0 of the first register 71 allocated to the SRAM 0, which is one of the internal memories 20 to 23, are "00," then the SRAM 0 is used as a work region, if they are "01," then the SRAM 0 is used as a frame region, if they are "10," then the SRAM 0 is used as a CPU region. If the SRAM 0 is not used, for example because it is defective, then the bits 1 and 0 of the first register 71 should be set to "11." In this case, the supply of power to the SRAM 0 is stopped, and it can be ensured that no addresses are allocated to that SRAM 0. Similarly, the bits 3 and 2 of the first register 71 specify the intended use of the SRAM 1, the bits 5 and 4 specify the intended use of the SRAM 2, the bits 7 and 6 specify the intended use of the SRAM 3, the bits 9 and 8 specify the intended use of the external memory 14 made of the SDRAM. If the content of the first register 71 is changed as appropriate, it is possible to achieve data transfer between the WM bus 40, the FM bus 41 and the CPU bus 42. For example, if the bits 3 and 2 of the first register 71 are changed from "00 (work region)" to "01 (frame region)," the data written via the WM bus 40 into the SRAM 1, which is one of the internal memories 20 to 23, can be read out into the FM bus 41.

For memories for which there is no DMA reservation, the first register 71 can make changes while in operation, but for memories for which there is an DMA reservation and that are being accessed or for which there is the possibility of access, it should be ensured that the content of the first register 71 cannot be changed. Changes to the first register 71 are basically performed under the responsibility of software run on the main processor 24.

Figure 5A:
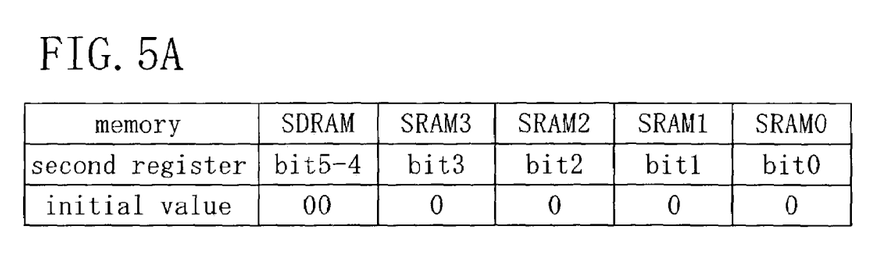
FIG. 5A shows an example of a second register for specifying the storage capacity of the memories in the semiconductor integrated circuit device in FIG. 1.
Figure 5B:
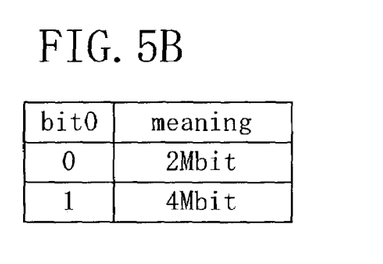
FIG. 5B illustrates the meaning of the least significant bit in that register.
Figure 5C:
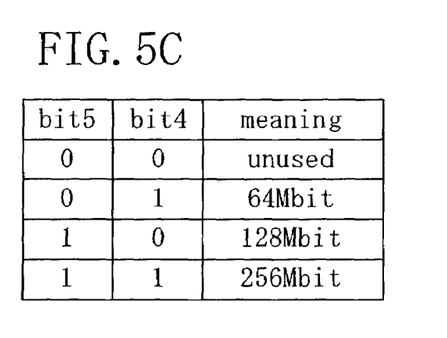
FIG. 5C illustrates the meaning of the most significant two bits in that register.

FIG. 5A shows an example of a second register 72 with a 6-bit configuration for specifying the storage capacity of the memories, FIG. 5B shows an example of the meaning of the least significant bit in that register 72, and FIG. 5C shows an example of the meaning of the most significant two bits in that register 72. If the bit 0 of the second register 72 assigned to the SRAM 0, which is one of the internal memories 20 to 23, is "0," then the SRAM 0 has a storage capacity of 2 Mbit, and if it is "1," then the SRAM 0 has a storage capacity of 4 Mbit. Similarly bit 1 of the second register 72 specifies the storage capacity of the SRAM 1, bit 2 specifies that of the SRAM 2, and bit 3 specifies that of the SRAM 3. Furthermore, if the bits 5 and 4 of the second register 72, which are assigned to the external memory 14 made of an SDRAM, are "01," then that SDRAM has a storage capacity of 64 Mbit, if they are "10," then that SDRAM has a storage capacity of 128 Mbit, and if they are "11," then that SDRAM has a storage capacity of 256 Mbit. If the external memory 14 for some reason is not used, then the bits 5 and 4 of the second register 72 should be set to "00." It should be noted that the content of the second register 72 should be determined when starting up the semiconductor integrated circuit device 10.

Figure 6A:
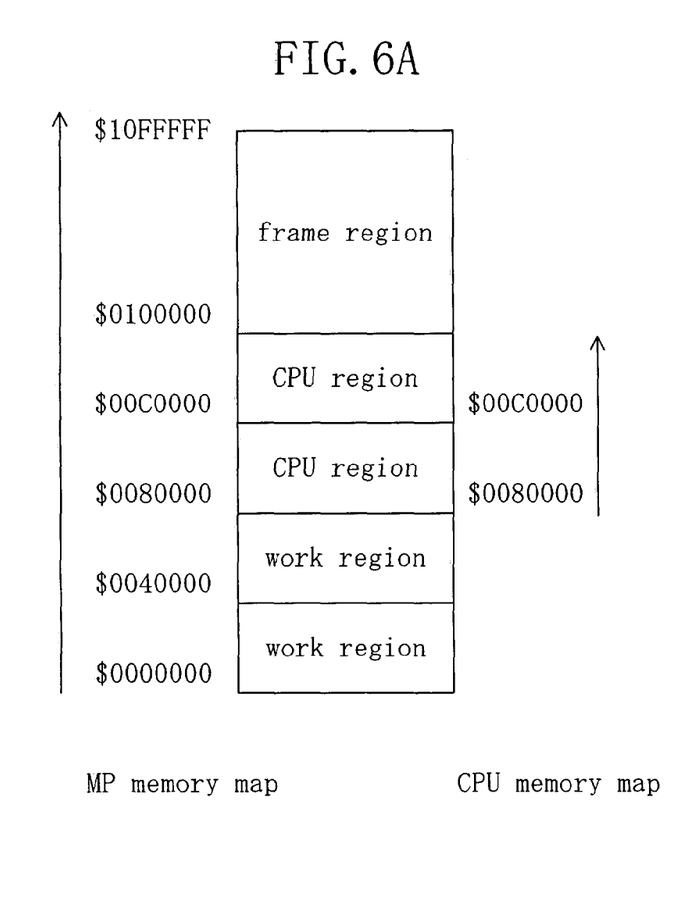
FIG. 6A shows an example of specifying absolute addresses for the memory assigned to the external CPU in the semiconductor integrated circuit device of FIG. 1.
Figure 6B:
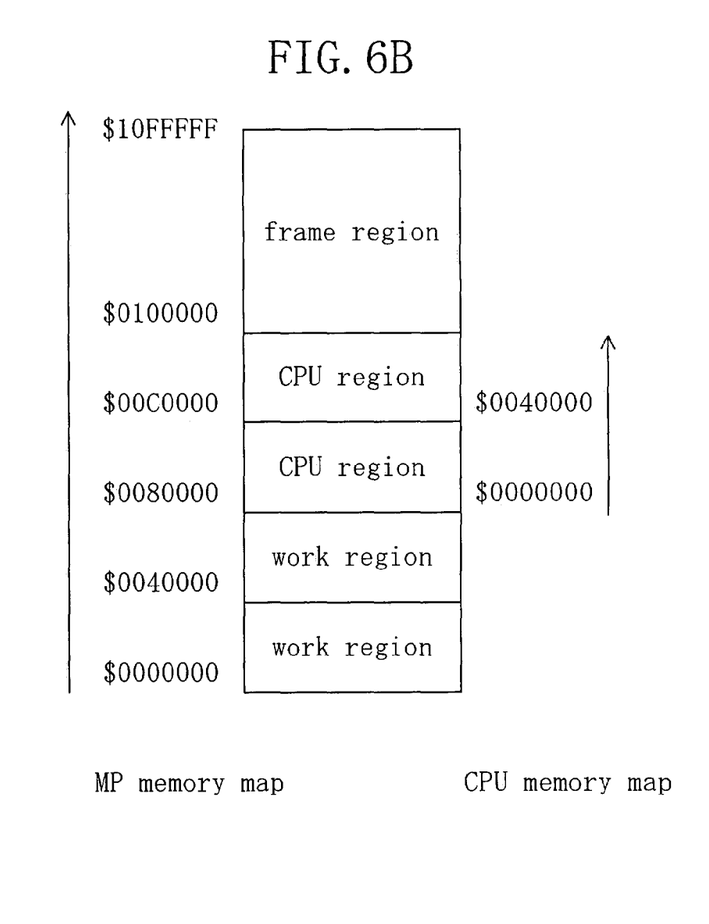
FIG. 6B shows an example of specifying relative addresses for the memory assigned to the external CPU.

FIG. 6A shows an example of specifying absolute addresses for the memory assigned to the CPU 11 in the semiconductor integrated circuit device 10 in FIG. 1, and FIG. 6B shows an example of specifying relative addresses for the memory assigned to the CPU 11. Here, the storage capacities of the internal memories 20 to 23 are 2 Mbit each, and the storage capacity of the external memory 14 is 128 Mbit. It is assumed that the SRAM 0 and the SRAM 1 of the internal memories 20 to 23 are specified as the work region, the SRAM 2 and the SRAM 3 of the internal memories 20 to 23 are specified as the CPU region, and the external memory 14 is specified as the frame region. In FIGS. 6A and 6B, seen from the main processor 24, addresses are assigned to the memories as one continuous address space, regardless of work region, frame region and CPU region. On the other hand, for the address map of the CPU region that can be seen from the CPU 11, it is possible to select either the absolute addresses in FIG. 6A or the relative addresses in FIG. 6B. If relative addresses as in FIG. 6B are specified, the CPU region is always mapped starting at the address 0, so that the load on the CPU 11 is reduced.

Figure 7:
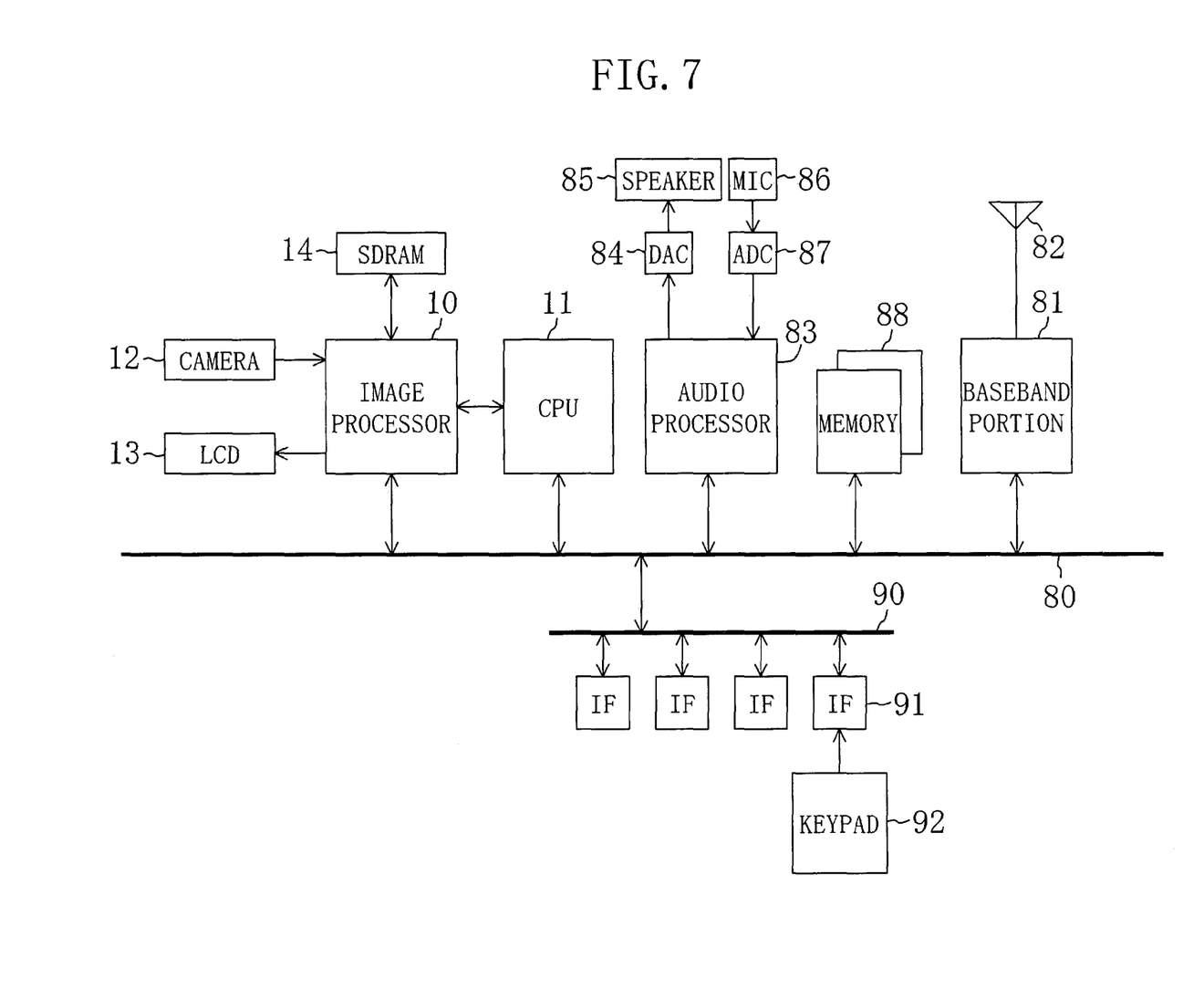
FIG. 7 is a block diagram showing an example of the configuration of a portable communication terminal using the semiconductor integrated circuit device in FIG. 1 as an image processor.

FIG. 7 shows an example of the configuration of a portable communication terminal (such as a mobile phone) using the semiconductor integrated circuit device 10 in FIG. 1 as an image processor. In addition to that image processor 10, the above-mentioned CPU 11, the camera 12, the liquid crystal display 13 and the SDRAM 14, the portable communication terminal in FIG. 7 includes a baseband portion 81, an audio processor 83, and a memory 88. The image processor 10, the CPU 11, the baseband portion 81, the audio processor 83 and the memory 88 are connected to one another via a main bus 80. Furthermore, that the asynchronous serial interface 28 in the image processor 10 allows serial communication between the image processor 10 and the CPU 11 is as described above (see FIG. 1).

The baseband portion 81 sends and receives multiplexed streams via an antenna 82. A speaker 85 is connected via a digital/analog converter (DAC) 84 to the audio processor 83, and a microphone 86 is connected via an analog/digital converter (ADC) 87 to the audio processor 83. If, for example, the baseband portion 81 receives a multiplexed stream, then the CPU 11 divides that multiplexed stream into an audio stream and an image stream, and the audio stream is supplied via the main bus 80 to the audio processor 83, whereas the image stream is supplied by serial communication to the image processor 10. Then, the audio processor 83 decodes the audio stream, and audio is output from the speaker 85. On the other hand, the image processor 10 decodes the image stream, and outputs the decoded image data on the liquid crystal display 13, while storing them in the work region.

The portable communication terminal in FIG. 7 further includes an IO bus 90, to which a plurality of interfaces 91 are connected. One of these interfaces 91 is connected to a keypad 92. When the CPU 11 receives an input from the keypad 92, it directly writes graphics data corresponding to the input via the CPUIF 34 in the image processor 10 into the CPU region. In accordance with instructions from the CPU 11 or the main processor 24, the image processor 10 changes the memory configuration by changing the CPU region into a frame region and the frame region into a CPU region, synthesizes the graphics data in the frame region and the image data in the work region, and outputs the result on the liquid crystal display 13.

With the image processor 10, images that are input with the camera 12 can be subjected to MPEG encoding, and the result of that process can be output via the asynchronous serial interface 28 to the CPU 11. Alternatively, when the CPU 11 subjects the images captured by the camera 12 and stored in the work region to JPEG encoding, the memory configuration is changed by changing the work region to a CPU region in accordance with instructions from the CPU 11 or the main processor 24, and still picture data are directly read out by the CPU 11 from the CPU region.

In this manner, the semiconductor integrated circuit device 10 of FIG. 1 is favorably utilized for image processing by portable communication terminals.

The invention may be embodied in other forms without departing from the spirit or essential characteristics thereof. The embodiments disclosed in this application are to be considered in all respects as illustrative and not limiting. The scope of the invention is indicated by the appended claims rather than by the foregoing description, and all changes which come within the meaning and range of equivalency of the claims are intended to be embraced therein.

What is claimed is:

1. A semiconductor integrated circuit device that operates while being connected to an external processing unit, comprising:
    a plurality of internal memories;
    a first processing unit for data processing and a second processing unit for data processing;
    a first data bus connected to the first processing unit;
    a second data bus connected to the second processing unit;
    a third data bus dedicated to the external processing unit;
    a first bus selector for selectively connecting the first processing unit with the first data bus or the second data bus;
    a second bus selector for selectively connecting the second processing unit with the first data bus or the second data bus;
    a first memory interface, mediating and controlling DMA data transfer requests from the first processing unit and second processing unit, which is interposed between the memory assigned to the first processing unit and the first data bus;
    a second memory interface, mediating and controlling DMA data transfer requests from the first processing unit and second processing unit, which is interposed between the memory assigned to the second processing unit and the second data bus;
    a third memory interface, controlling a data transfer, which is interposed between the memory assigned to the external processing unit and the third data bus; and
    a memory configuration controller for controlling the assignment of the plurality of internal memories to the first processing unit, the second processing unit and the external processing unit in accordance with an application.

2. The semiconductor integrated circuit device according to claim 1,
    wherein the memory configuration controller further has the function to control the assignment of external memory to the first processing unit, the second processing unit and the external processing unit, in accordance with an application.

3. The semiconductor integrated circuit device according to claim 2,
    wherein the memory configuration controller comprises a first register for specifying the assignment of the plurality of internal memories and the external memory; and
    wherein data transfer between the first to third data buses is accomplished by rewriting the content of the first register.

4. The semiconductor integrated circuit device according to claim 3,
    wherein the first register is configured such that it can specify which of the plurality of internal memories and the external memory is unused.

5. The semiconductor integrated circuit device according to claim 2,
    wherein the memory configuration controller comprises a second register for specifying the respective storage capacities of the plurality of internal memories and the external memory.

6. The semiconductor integrated circuit device according to claim 1,
    wherein the first processing unit comprises a local memory; and
    wherein DMA data transport can be carried out between the local memory and the memory assigned to the first processing unit.

7. The semiconductor integrated circuit device according to claim 1, further comprising:
    a host interface that is interposed between the external processing unit and the third data bus; and
    a third bus selector for selectively connecting the host interface with the first data bus or the second data bus.

8. The semiconductor integrated circuit device according to claim 1, further comprising:

a fourth bus selector for selectively connecting the third data bus with the third memory interface or the second data bus.

9. The semiconductor integrated circuit device according to claim 8, configured such that a relative address is supplied by the external processing unit when the fourth bus selector selects a connection between the third data bus and the third memory interface, whereas an absolute address is supplied by the external processing unit when the fourth bus selector selects a connection between the third data bus and the second data bus.

10. A portable communication terminal, comprising a semiconductor integrated circuit device according to any of claims 1, 2–5 and 6–9 for image processing.

* * * * *